(12) United States Patent
Oka et al.

(10) Patent No.: US 6,615,252 B1
(45) Date of Patent: *Sep. 2, 2003

(54) ON-DEMAND SYSTEM FOR SERVING MULTIMEDIA INFORMATION IN A FORMAT ADAPTED TO A REQUESTING CLIENT

(75) Inventors: Toshio Oka, Yokohama (JP); Tomoko Matsuzawa, Tokyo (JP); Tsutomu Uenoyama, Kawasaki (JP); Yoshihiro Hayakawa, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/037,716

(22) Filed: Mar. 10, 1998

(65) Prior Publication Data (65)

(51) Int. Cl.$^7$ ............................................. G06F 15/16
(52) U.S. Cl. ................................. 709/219; 707/501
(58) Field of Search ................................. 709/214, 223, 709/224, 277, 204, 217, 227, 102; 707/501, 8, 10, 526; 717/5; 386/52; 370/85.7; 348/384

(56) References Cited

U.S. PATENT DOCUMENTS

| | | | | |
|---|---|---|---|---|
| 5,119,465 A | * | 6/1992 | Jack et al. ....................... 717/5 |
| 5,660,547 A | * | 8/1997 | Copperman .................... 434/29 |
| 5,708,826 A | * | 1/1998 | Ikeda et al. ................. 707/501 |
| 5,745,758 A | * | 4/1998 | Shaw et al. .................. 709/102 |
| 5,801,781 A | * | 9/1998 | Hiroshima et al. .......... 348/441 |
| 5,826,024 A | * | 10/1998 | Higashimura et al. ...... 709/214 |
| 5,848,415 A | * | 12/1998 | Guck ........................... 707/10 |
| 5,853,292 A | * | 12/1998 | Eggert et al. ................ 434/262 |
| 5,857,187 A | * | 1/1999 | Uenoyama et al. ............. 707/8 |
| 5,898,685 A | * | 4/1999 | Schnizlein ................... 370/350 |
| 5,937,421 A | * | 8/1999 | Petrov et al. ................ 707/526 |
| 5,983,004 A | * | 11/1999 | Shaw et al. .................. 709/227 |
| 6,016,380 A | * | 1/2000 | Norton ......................... 386/52 |
| 6,018,765 A | * | 1/2000 | Durana et al. ............... 709/217 |
| 6,094,684 A | * | 7/2000 | Pallmann ..................... 709/227 |

FOREIGN PATENT DOCUMENTS

| | | |
|---|---|---|
| AU | B-59462/96 | 1/1997 |
| EP | 0753821 | 1/1997 |
| JP | 2297674 | 12/1990 |
| JP | 8-228323 | 9/1996 |

OTHER PUBLICATIONS

Kostler et al. "Client–Server Optmization for Multimedia Document Exchange".

Shibata et al. "Dynamic Hypertext and knowledge agent systems for multimedia".

(List continued on next page.)

*Primary Examiner*—Mark R. Powell
*Assistant Examiner*—Thong Vu
(74) *Attorney, Agent, or Firm*—Israel Gopstein; Clark & Brody

(57) ABSTRACT

Prior to sending to a requesting client device a requested multimedia application which comprises a plurality of kinds of materials and a scenario which defines a role of each material, the server converts an input (or original) format of a certain kind of materials of the requested application into a format with which the requesting client device can deal and converts format-dependent data of the scenario accordingly. This enables every consuming device to consume any of the multimedia applications stored in the server regardless of the material format with which the consuming device can deal with respective to a certain kind of materials. Four schemes different in conversion timing of the materials and the scenario are disclosed. The original format of the materials may be limited to a master data format, eg., the DV format if the certain kind of materials are moving picture materials.

23 Claims, 14 Drawing Sheets

OTHER PUBLICATIONS

Correia et al. "WeatherDigest: an experiment on media conversion."

MPEG–2 coded and uncoded–stream synchronization control for real time multimedia transmission and presentation over B–ISDN, in: Proceedings of the second ACM internaton conference on Multimedia '94, pp. 239–246, Lian Li et al.

Masinter, Document Management, Digital Libraries and the Web, 1995.*

Vasquez et al, Throughput analysis of p–CMSA based LonkTalk protocols for building management systems IEEE1996.*

Maule, Multimedia Information Networks IEEE 1991.*

Hirzalla et al, A temporal model for interactive scenario, IEEE, 1995.*

* cited by examiner

FIG. 2

```
210 ┌ TITLE:     211
    └  TitleName=Title0001
      ┌ MATERIAL:  221        222          223
      │  MatIDinVSC=V0001:MatFormat=DV:MatData=movie0001.dv
220 ─┤  MatIDinVSC=V0002:MatFormat=DV:MatData=movie0002.dv
      └  MatIDinVSC=V0003:MatFormat=BMP:MatData=image0001.bmp
                                    :
                                    :
      ┌ EVENT:   231      232     221        234              235
      │  EventID=E0001:Time=200:MatIDinVSC=V0001:Location=(300,400):Action=PLAY
230 ─┤  EventID=E0002:Time=300:MatIDinVSC=V0002:Location=(200,300):Action=PLAY
      │  EventID=E0003:Time=400:MatIDinVSC=V0003:Location=(100,300):Action=DISPLAY
      └  EventID=E0004:Time=400:MatIDinVSC=V0001:Location=(300,400):Action=STOP
                                    :
                                    :
```

FIG. 4

| MATERIAL ID | MATERIAL INFORMATION (Mat Data) |
|---|---|
| ⋮ | ⋮ |
| S5116 | image0001.bmp |
| S5117 | movie0001.dv |
| S5290 | movie0002.dv |
| S2560 | movie0001.mp1 |
| S2737 | movie0002.mp1 |
| S6000 | movie0001.mp2 |
| S6001 | movie0002.mp2 |
| | |

401　　　　　　　　　　　　　　223

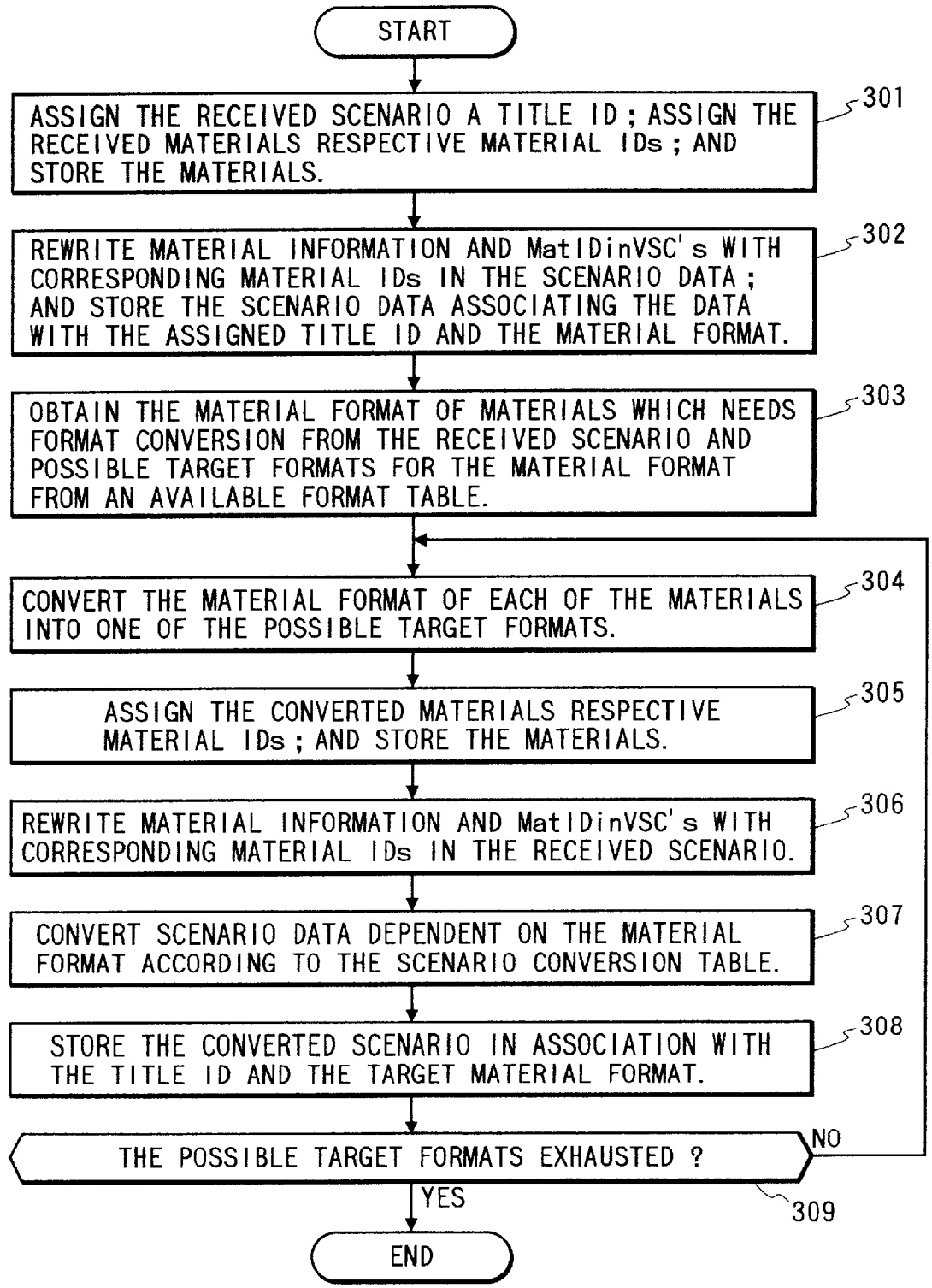

FIG. 5

```
TITLE:    ~211
   TitleName=Title0001
MATERIAL:   ~401         ~222
   MatIDinServer=S5117:MatFormat=DV
   MatIDinServer=S5290:MatFormat=DV
   MatIDinServer=S5116:MatFormat=BMP
           :
           :
EVENT:    ~231    ~232    ~401               ~234           ~235
   EventID=E0001:Time=200:MatIDinServer=S5117:Location=(300,400):Action=PLAY
   EventID=E0002:Time=300:MatIDinServer=S5290:Location=(200,300):Action=PLAY
   EventID=E0003:Time=400:MatIDinServer=S5116:Location=(100,300):Action=DISPLAY
   EventID=E0004:Time=400:MatIDinServer=S5117:Location=(300,400):Action=STOP
           :
           :
```

FIG. 6

| INPUT FORMAT | TARGET FORMAT(S) |
|---|---|
| DV | MPEG1, MPEG2 |
| MPEG2 | MPEG1 |

FIG. 7

| INPUT FORMAT | TARGET FORMAT | SCENARIO CONVERSION INFORMATION |
|---|---|---|
| DV | MPEG1 | Time=Time*100 |
| DV | MPEG2 | Time=Time |
| MPEG2 | MPEG1 | Time=Time*100 |

FIG. 8

```
TITLE: 211
  TitleName=Title0001
MATERIAL: 401    222
  MatIDinServer=S2560:MatFormat=MPEG1
  MatIDinServer=S2737:MatFormat=MPEG1
  MatIDinServer=S5116:MatFormat=BMP
        :
        :
EVENT: 231   832      401            234              235
  EventID=E0001:Time=2:MatIDinServer=S2560:Location=(300,400):Action=PLAY
  EventID=E0002:Time=3:MatIDinServer=S2737:Location=(200,300):Action=PLAY
  EventID=E0003:Time=4:MatIDinServer=S5116:Location=(100,300):Action=DISPLAY
  EventID=E0004:Time=4:MatIDinServer=S2560:Location=(300,400):Action=STOP
        :
        :
```

| TITLE ID | MATERIAL FORMAT | SCENARIO INFORMATION |
|---|---|---|
| T0001 | DV | title001dv.vsc |
|  | MPEG1 | title001m1.vsc |
|  | MPEG2 | title001m2.vsc |

SERVICE OPERATION (SCHEME 1)

START

101 READ THE SCENARIO DATA FROM THE STORAGE DEVICE 11 BY USING A TITLE ID AND A MATERIAL FORMAT SPECIFIED BY THE REQUESTING CLIENT 3.

102 REWRITE THE MATERIAL IDs (Sxxxx) WITH MATERIAL INFORMATION AND MatIDinVSC's IN THE SCENARIO DATA.

103 SEND THE SCENARIO AND THE MATERIALS USED IN THE SCENARIO TO THE REQUESTING CLIENT 3.

END

FIG. 11

```
TITLE:
  TitleName=Title0001
MATERIAL:
  MatIDinVSC=V0001:MatFormat=MPEG1:MatData=movie0001.mp1
  MatIDinVSC=V0002:MatFormat=MPEG1:MatData=movie0002.mp1
  MatIDinVSC=V0003:MatFormat=BMP:MatData=image0001.bmp
       :
       :
EVENT:
  EventID=E0001:Time=2:MatIDinVSC=V0001:Location=(300,400):Action=PLAY
  EventID=E0002:Time=3:MatIDinVSC=V0002:Location=(200,300):Action=PLAY
  EventID=E0003:Time=4:MatIDinVSC=V0003:Location=(100,300):Action=DISPLAY
  EventID=E0004:Time=4:MatIDinVSC=V0001:Location=(300,400):Action=STOP
       :
       :
```

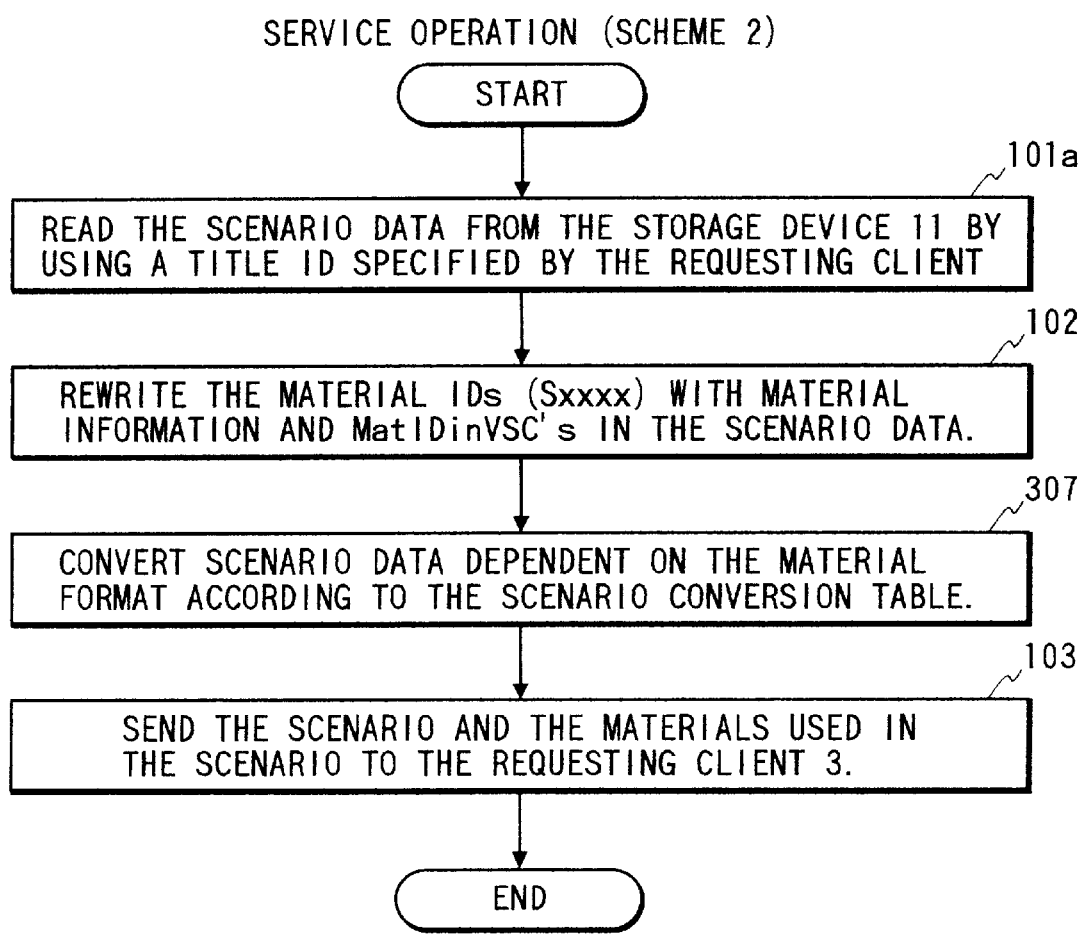

FIG. 15

REGISTRATION OPERATION (SCHEME 3)

START
↓
301: ASSIGN THE RECEIVED SCENARIO A TITLE ID; ASSIGN THE RECEIVED MATERIALS RESPECTIVE MATERIAL IDs; AND STORE THE MATERIALS.
↓
302a: REWRITE MATERIAL INFORMATION AND MatIDinVSC's WITH CORRESPONDING MATERIAL IDs IN THE SCENARIO DATA; AND STORE THE SCENARIO DATA ASSOCIATING THE DATA WITH THE ASSIGNED TITLE ID.
↓
END

FIG. 17

| INPUT FORMAT | TARGET FORMAT | |
| --- | --- | --- |
| | CONVERTED AT REGISTRATION TIME | CONVERTED AT SERVICE TIME |
| DV | MPEG2 | MPEG1 |
| MPEG2 | | MPEG1 |

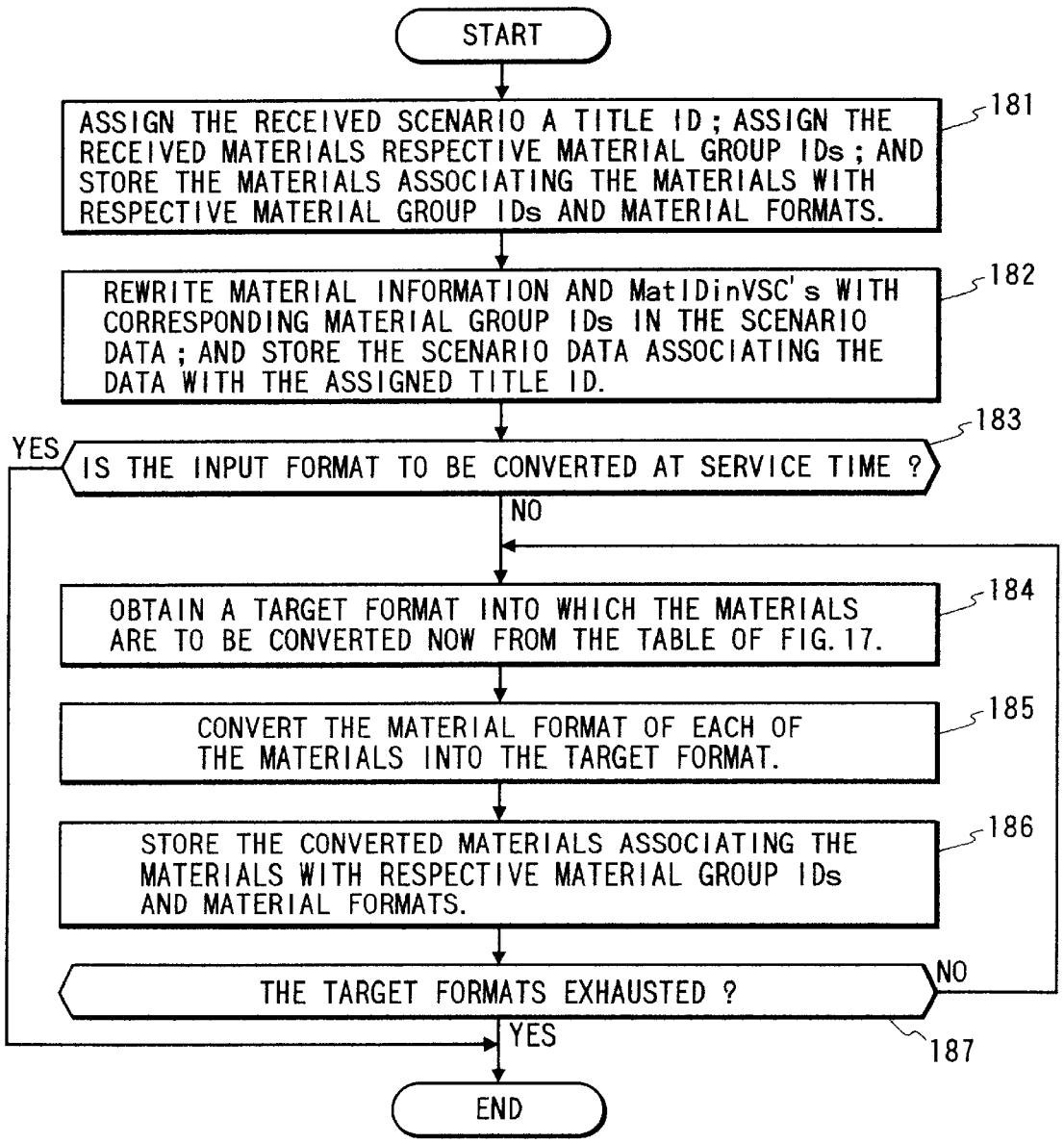

FIG. 19

| M.G. ID | MATERIAL FORMAT | MATERIAL INFORMATION |
|---|---|---|
| ⋮ | ⋮ | ⋮ |
| S0245 | DV | movie0001.dv |
|  | MPEG1 | movie0001.mp1 |
|  | MPEG2 | movie0001.mp2 |
| S0140 | DV | movie0002.dv |
|  | MPEG1 | movie0002.mp1 |
|  | MPEG2 | movie0002.mp2 |
| S0221 | BMP | image0001.bmp |

FIG. 20

```
TITLE:
 TitleName=Title0001
MATERIAL:
 MatIDinServer=S0245:MatFormat=DV
 MatIDinServer=S0140:MatFormat=DV
 MatIDinServer=S0221:MatFormat=BMP
          :
          :
EVENT:
 EventID=E0001:Time=200:MatIDinServer=S0245;Location=(300,400):Action=PLAY
 EventID=E0002:Time=300:MatIDinServer=S0140;Location=(200,300):Action=PLAY
 EventID=E0003:Time=400:MatIDinServer=S0221;Location=(100,300):Action=DISPLAY
 EventID=E0004:Time=400:MatIDinServer=S0245;Location=(300,400):Action=STOP
          :
          :
```

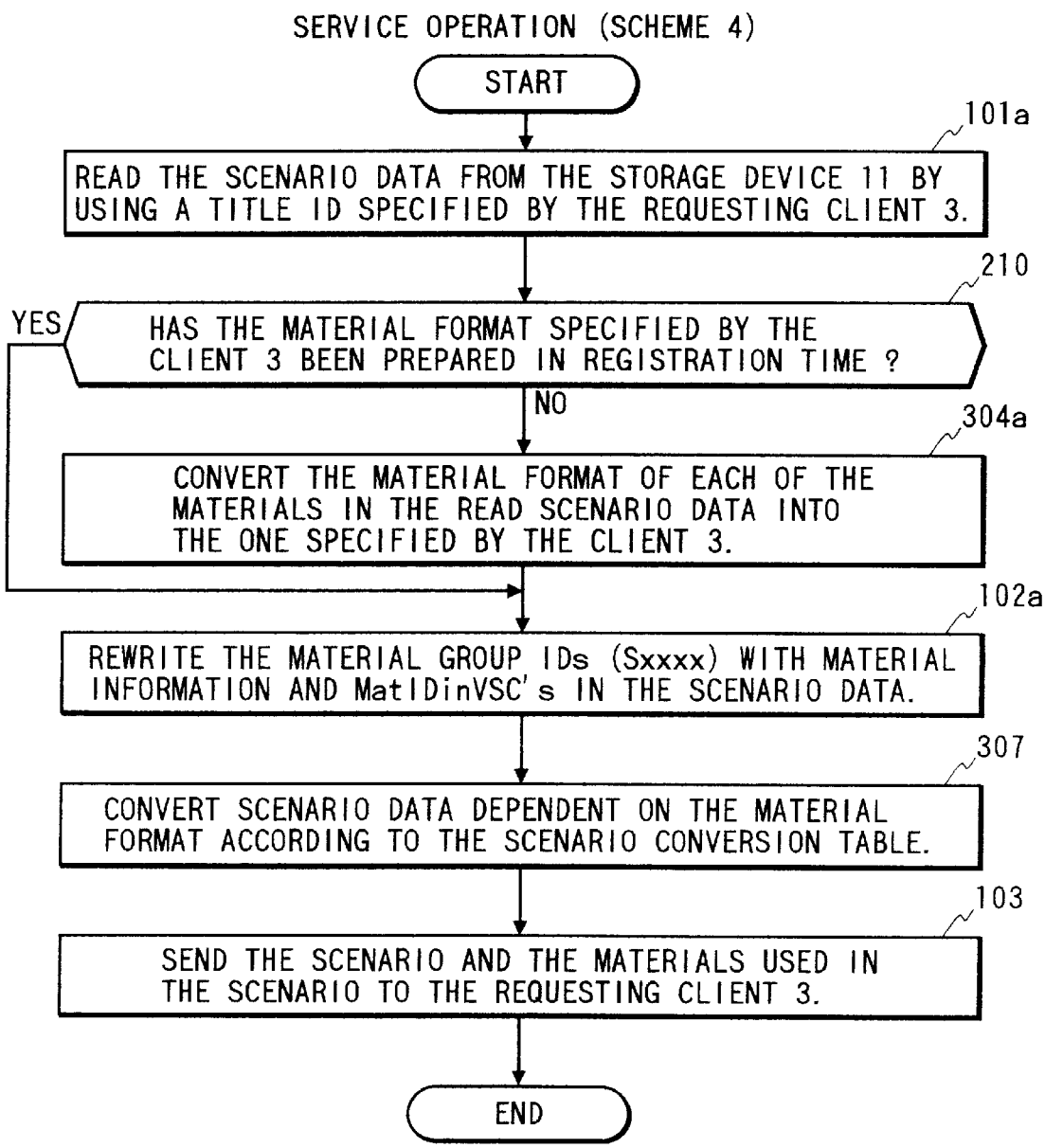

FIG. 22

| MATERIAL INFORMATION | MASTER DATA INFO. | MASTER DATA FORMAT |
|---|---|---|
| movie0001.mp1 | movie0001.dv | DV |
| movie0002.mp2 | movie0002.dv | DV |
| ⋮ | ⋮ | ⋮ |

ON-DEMAND SYSTEM FOR SERVING MULTIMEDIA INFORMATION IN A FORMAT ADAPTED TO A REQUESTING CLIENT

BACKGROUND OF THE INVENTION

1. Field of the Invention

The present invention generally relates to an on-demand multimedia server and more particularly to a server, responsive to a request from one of consuming devices, for serving requested multimedia information in a format adapted to the requesting consuming device.

2. Description of the Prior Art

Some of the terms used herein will be first defined for the sake of better understanding the following description. Multimedia information of each of a plurality of multimedia applications is a compiled set of single-media data such as video, animation, graphics, sound, text and computer programs, which are each called a "material." Each material is represented by "material data" contained in a "material file." Information on a specific material (file) including the file name and attributes of the material data is referred to as "material information." The data format of material data or file is referred to as "material format," which may be, for example, an MPEG 1 (Moving Picture Coding Experts Group 1) format in case of video, a JPEG (Joint Photographic Coding Experts Group) format in case of graphics and so forth. Each of the multimedia applications generally comprises some kinds of material data constituting the multimedia application and "scenario data" which describes how each material plays its role in the application (e.g., from when a first material, for example a video, is to be replayed; when and in what part of the screen a second material, for example a still picture, is to be displayed; and so on). Information on a specific scenario (file) including the file name and attributes of the scenario is referred to as "scenario information."

There are various kinds of so-called multimedia service systems. In such a system, each of the multimedia applications is prepared by preparing material data used in the application and creating scenario data for the application in a multimedia source device and by storing the material data and the scenario data in a multimedia server. Multimedia information is provided to the user in a multimedia consuming device or play-back device by the multimedia server serving material data and scenario data for a specified multimedia application to the consuming device, which uses the served data to reproduce or play back the specified multimedia application. In this way, prepared material data and scenario data are stored and served as they are.

As described above, there are various types of materials such as video, animation, graphics, sound, text and computer programs. There may be also various data formats even for the same type of material. Specifically, data formats for a material type of, e.g., video (or moving picture) include DV, MPEG 2, MPEG 1, etc., and there are variety of data formats for a material type of, e.g., graphics (or still picture) including JPEG, BMP (the standard bit-mapped graphics format used in the Windows environment), etc.

If two materials are in different formats even though the materials are of an identical material type, reproduction of the two materials stored in the different format needs different play-back devices with respective structures and functions. To take an example, a play-back device for playing back moving picture data in the DV format has a function of extracting an image signal from DV format data. Similarly, a play-back device for playing back moving picture data in the MPEG 1 format has a function of extracting an image signal from MPEG 1 format data. These two functions are different from each other and neither function includes the other.

Further, in order to play back moving picture of a bit rate (which is determined by the frame size, the frame frequency and the resolution of the moving picture) exceeding a certain level, it is necessary to realize, by means of hardware, at least a part of the function of extracting an image signal from moving picture data regardless of whichever format the moving picture data is in. For this reason, it is not a practical solution to provide each play-back device with play-back functions for different data format.

It is therefore an object of the invention to provide a multimedia information server which serves each of consuming devices (or client play-back devices) with a multimedia application in a format adapted to the consuming device.

SUMMARY OF THE INVENTION

In a multimedia information service system, a server is supplied with multimedia applications each comprising a plurality of kinds of materials and a scenario which defines a role of each material. The server registers or stores each (multimedia) application in response to a reception thereof (registration operation) and, in response to a request from one of a plurality of consuming devices or clients, serves a requested one of the applications in a format with which the requesting client can deal with respect to materials of a certain kind (e.g., moving picture materials) among the plurality of kinds (service operation). In accordance with one aspect of the invention, the server converts an input (or original) format of the certain kind of materials of at least one of the applications into at least one of target formats associated with the input format either in the registration operation or in the serving, or service operation (material conversion). Each scenario of the at least one application (which scenario is for said input format) is converted into at least one scenario of that application in the target formats, either in the registration operation or in the service operation (scenario conversion). In response to a request for one of the applications, the server serves the requesting one of the consuming devices with at least a scenario of the requested application which scenario has been adapted to the format with which the requesting consuming device can deal. This enables every consuming device to consume any of the multimedia applications stored in the server regardless of the material format with which the consuming device can operate with respect to a certain kind of material.

In one specific embodiment of the invention, both of the material conversion and the scenario conversion are performed in the registration operation. This enables a quick response in service operation but will need a mass storage device of the largest capacity.

In another specific embodiment of the invention, the material conversion (which takes more time than the scenario conversion) is performed in the registration operation and the scenario conversion is performed in the service operation. This enables a relatively quick response in service operation with a mass storage device of a relatively large capacity.

In further specific embodiment of the invention, both of the material conversion and the scenario conversion are performed in service operation. This can save the capacity of the mass storage device but will cause the service operation to take time.

In still further specific embodiment of the invention, materials which take more time for format conversion are converted in the registration operation, and the scenario of requested application and, if the materials for the requested application have not been converted, such materials are converted in the service operation. In this case, the server will afford a quicker service at the cost of moderate capacity of the mass storage device.

The input material formats may be limited to master data formats, i.e., data formats that each contains the maximum quantity of information in all the data formats for one category of materials, and material formats available for service may be obtained by converting the master data formats. By doing this, the server can provide multimedia information of further higher quality.

BRIEF DESCRIPTION OF THE DRAWING

Further objects and advantages of the present invention will be apparent from the following description of the preferred embodiments of the invention as illustrated in the accompanying drawing, in which:

FIG. 2 shows an exemplary structure of scenario data for an application using moving pictures of the DV format as materials;

FIG. 3 is a flow chart showing an exemplary registration operation executed by the multimedia server 10 under the control of a program to which scheme 1 of the invention is applied;

FIG. 4 is a material table which contains material IDs and material information for all the materials having been registered so far in the server 10;

FIG. 5 is an exemplary structure of a scenario which has been obtained by replacing MatIDinVSC's 221 with corresponding material IDs (MatIDinServer's) (401) in accordance with the table 400 of FIG. 4 and eliminating the material information (MatData) in the scenario 200;

FIG. 6 is an exemplary available material format table which comprises an input format field and an output (or target) format field which contains target formats into which the input target format is to be converted;

FIG. 7 is an exemplary scenario conversion table each record of which contains scenario conversion information or data to be converted with the format conversion of materials for each of possible conversion patterns (i.e., combinations of possible input formats and output (or target) formats);

FIG. 8 is a scenario 800 obtained by converting data in the ID-converted scenario which data are dependent on the material format referring to the scenario conversion table of FIG. 7;

FIG. 9 is a diagram showing a part of a scenario information table used for identifying the scenarios in the server 10;

FIG. 10 is a flow chart showing an exemplary service operation executed by the multimedia server 10 under the control of a service program to which scheme 1 of the invention is applied;

FIG. 11 is a scenario obtained by rewriting the material IDs and adding material information (MatData) to each line of the MATERIAL section in a scenario read from the storage device 11 in response to a service request;

FIG. 13 is a diagram showing a part of a scenario information table used for identifying the scenarios in the server 10;

FIG. 14 is a flow chart showing an exemplary service operation according to scheme 2 of the invention;

FIG. 15 is a flow chart showing an exemplary registration operation according to scheme 3 of the invention;

FIG. 17 is an exemplary available material format table which defines and classifies possible format conversions by operation in which the conversion is to be done;

FIG. 18 is a flow chart showing an exemplary registration operation according to scheme 4 of the invention;

FIG. 19 is a table the server 10 keeps to manage the materials in the server 10;

FIG. 20 is an example of a scenario stored as a result of the steps 181 and 182;

FIG. 21 is a flow chart showing an exemplary service operation according to scheme 4 of the invention; and FIG. 22 is an exemplary master data table used in embodying a fifth scheme of the invention.

Throughout the drawing, the same elements when shown in more than one figure are designated by the same reference numerals.

DETAILED DESCRIPTION OF THE PREFERRED EMBODIMENTS

Figure 1:
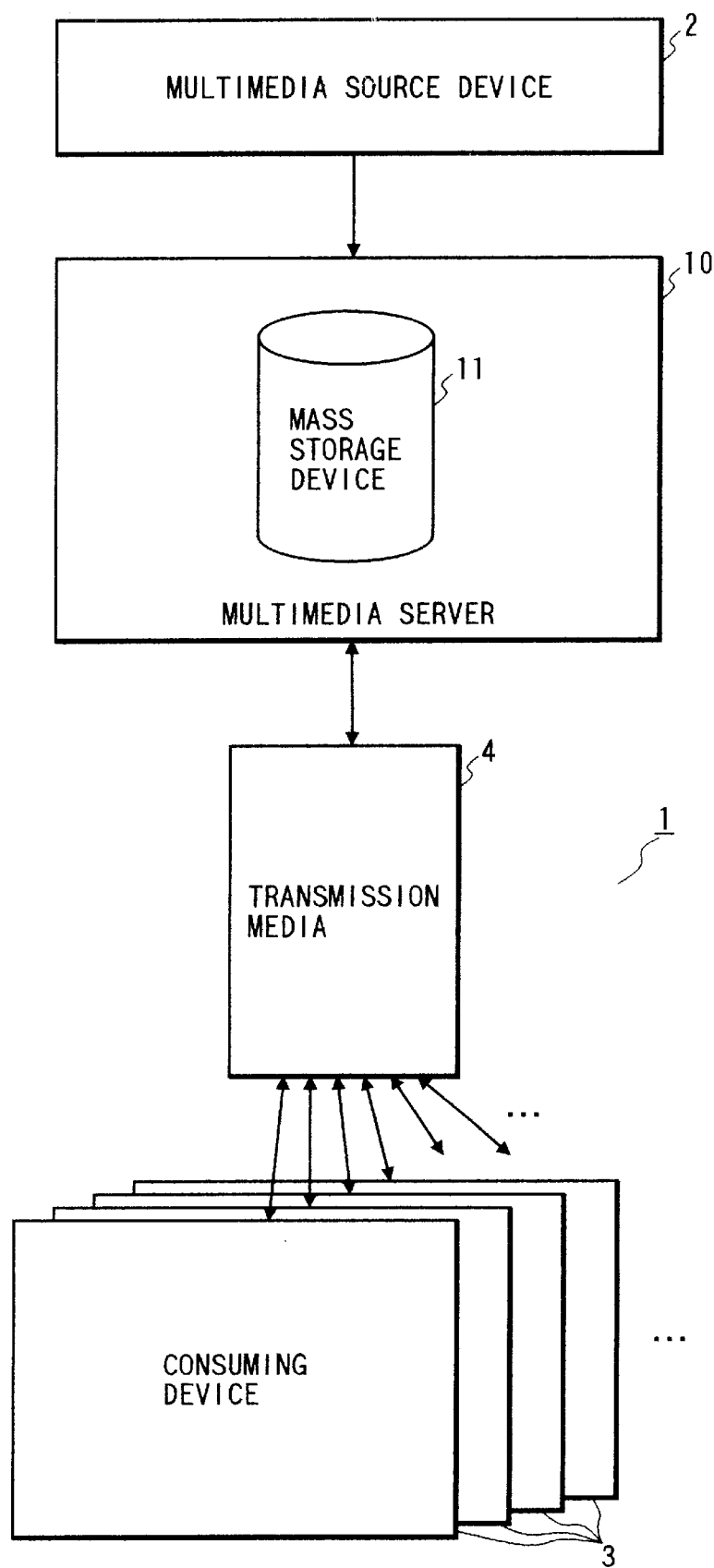
FIG. 1 is a schematic block diagram showing an exemplary multimedia information service system using a multimedia information server to which the principles of the invention are applied.

FIG. 1 is an exemplary multimedia information service system 1 using a multimedia information server 10 to which the principles of the invention are applied. The multimedia information service system 1 comprises a multimedia source device 2 for preparing and supplying multimedia applications each comprising scenario data and material data, the multimedia information server 10 which stores the multimedia applications supplied from the source device 2 and serves them in a format associated with the requesting device, a plurality of remote consuming devices or client devices 3 with a function of obtaining one of the multimedia applications from the server 10 and playing back the obtained multimedia application and transmission media 4 which connect the multimedia server 10 with the consuming devices 3 served by the server 10.

The multimedia server 10 may be any suitable computer provided with a mass storage device 11, which stores programs for controlling the server 10 and all of application data served by the server 10. The consuming device or client devices 3 may be any device having the above described function such as various tuners, play-back devices, multimedia information terminals, PCs (personal computers), etc.

In operation, the multimedia server 10 does two main jobs, that is, a registration of multimedia application (a registration operation) which is initiated by the supply of the multimedia application from the source device 2 and a service of multimedia application (a service operation) which is initiated by a request from one of the consuming devices 3 served by the server 10.

In order to achieve the object of the present invention, the server 10 has only to convert the scenario and the materials of a supplied multimedia application at any time in a time period from the reception of the multimedia application to the service thereof. Thus, we will propose four conversion schemes different in whether the conversions of the scenario and the materials are executed in the registration operation and/or the service operation as shown in the following table.

TABLE

| Scheme | Registration | Service |
|---|---|---|
| 1 | Scenario, Materials | |
| 2 | Materials | Scenario |
| 3 | | Scenario, Materials |
| 4 | Time consuming data | Time saving data |

If the scenario and the materials of each multimedia application are converted in the registration operation for the application (scheme 1 in the above table), the server 10 will afford a quickest service but will need a mass storage device 11 of largest capacity. If the materials of each application are converted in the registration operation for the application and the scenario of requested application is converted in the service operation (scheme 2), the server 10 will afford a quicker service at the cost of moderate capacity of the mass storage device 11. If both the scenario and the materials are converted in the service operation (scheme 3), the server 10 will only need the smallest capacity for the mass storage device 11 but will be slowest in response. In scheme 4, materials which take more time for format conversion are converted in the registration operation, and the scenario of requested application and, if the materials for the requested application have not been converted, such materials are converted in the service operation. In this case, the server 10 will afford a quicker service at the cost of moderate capacity of the mass storage device 11.

In any of above mentioned schemes, the registration operation is initiated by the server 10 receiving a multimedia application (i.e., a set of materials and a scenario in which the roles the materials should play are described) from the multimedia source device 2. FIG. 2 is an example of scenario data for an application using moving pictures of the DV format as materials.

In FIG. 2, the scenario (data) 200 comprises a TITLE section 210, a MATERIAL section 220 where information on the materials used in the application is described, and an EVENT section 230 where how the materials listed in the MATERIAL section 220 act in the application is described. In the TITLE section 210, an item "TitleName" 211 indicates the title or name of the application, e.g., Title0001 in this specific example.

In the MATERIAL section 220, each of the materials is described in a single line. In each line, an item "MatIDin-VSC" 221 indicates the identifier of the material described in the line which identifier is valid only in the scenario 200, an item MatFormat 222 indicates the material format of the material, and an item MatData 223 indicates material information on the material (or the file name of the material). As seen from this section, the multimedia application in this example comprises three materials with titles of V0001, V0002 and V0003; the material V0001 is in the DV format and has material information of "movie0001.dv"; the material V0002 is in the DV format and has material information of "movie0002.dv"; and the material V0003 is in the BMP format and has material information of "movie0003.bmp".

In the EVENT section 230, each of the events is described in a single line. Each line comprises an item EventID 231 which indicates an identifier of an event described by the line which identifier is valid only in the scenario 200, an item Time 232 which indicates the time to hold the event, the above mentioned item MatIDinVSC 221, an item Location 234 which indicates, in coordinates, a position on the screen where the event is held, i.e., the material for the event is displayed or played, and an item Action 235 which indicates an action to take for the event. In this specific example, the multimedia application comprises four events with event IDs (identifiers) of E0001, E0002, E0003 and E0004. As event E0001, the material V0001 is played at the position (300, 400) on the screen at the time of 200; as event E0002, the material V0002 is played at the position (200, 300) on the screen at the time of 300; as event E0003, the material V0003 is displayed at the position (100, 300) on the screen at the time of 400; and as event E0004, the play of the material V0001 being played at the position (300, 400) on the screen is stopped at the time of 400.

If the server 10 receives a multimedia application from the multimedia source device 2, the server 10 enters the registration operation.

Scheme 1

FIG. 3 is a flow chart showing an exemplary registration operation executed by the multimedia server 10 under the control of a program to which scheme 1 of the invention is applied. On entering the registration, the server 10 first registers or stores the received multimedia application without converting the formats of any materials constituting the application in steps 301 and 302. Specifically, in step 301, the server 10 assigns the received scenario a title ID (e.g., T0001), assigns the received materials "movie0001", "movie0002" and "image0001" respective material IDs (say, S5117, S5290 and S5116) as shown in FIG. 4, and stores the materials S5117, S5290 and S5116 in the mass storage device 11. The title ID is an identifier for identifying an application (or a group of scenarios for the application and for various material formats) in the server 10 and is used in combination with a material format to identify a scenario for the material format. FIG. 4 is a material table 400 which contains material IDs 401 and material information 223 for all the materials having been registered so far in the server 10 (Materials V0001 and V0002 of the MPEG 1 and MPEG 2 formats are also shown as registered in the material table 400). The material IDs 401 are identifiers which the server 10 uses to identify the materials. In step 302, the server 10 rewrites material information (MatData) 223 and MatIDin-VSC's 221 with corresponding material IDs in the scenario data 200 and stores the rewritten scenario data in the mass storage device 11 associating the data with the assigned title ID (T0001 in this example) and the moving picture material format (the DV format in this example). Doing this permits the server 10 to also identify the materials appearing in the scenario by means of the material IDs 401. FIG. 5 is the scenario which has been rewritten and stored in the mass storage device 11 in step 302. In the scenario 500, MatID-inVSC's V0001, V0002 and V0003 (221) have been replaced with material IDs (MatIDinServer's) S5117, S5290 and S5116 (401), respectively, in accordance with the table 400 of FIG. 4 and the material information (MatData) has been eliminated.

In the next step 303, the server 10 obtains the material information 223 and the material format 222 of materials which needs format conversion (e.g., materials for moving pictures) from the stored scenario 500 and further obtains target formats into which the obtained material format 222 can be converted referring to an available material format table as shown in FIG. 6. The table of FIG. 6 comprises an input format field and an output (or target) format field which contains target formats into which the input format is to be converted. In this example, the server 10 obtains, for moving picture materials V0001 and V0002, "DV" as the material format 222 and "movie0001.dv" and "movie0002.dv" as material information 223, and learns from the available material format table of FIG. 6 that the material format of the materials "movie0001.dv" and "movie0002.dv" is to be converted from the DV format to the MPEG 1 and MPEG 2 formats (and if the materials are of the MPEG 2 format, the server 10 will learn that the materials are to be converted into the MPEG1 format).

In the next step 303, the server 10 obtains the material information 223 and the material format 222 of materials which needs format conversion (e.g., materials for moving pictures) from the received scenario and further obtains target formats into which the obtained material format 222 can be converted referring to an available material format table as shown in FIG. 6. The table of FIG. 6 comprises an input format field and an output (or target) format field which contains target formats into which the input target format is to be converted. In this example, the server 10 obtains, for moving picture materials V0001 and V0002, "DV" as the material format 222 and "movie0001.dv" and "movie0002.dv" as material information 223, and learns from the available material format table of FIG. 6 that the material format of the materials "movie0001.dv" and "movie0002.dv" is to be converted from the DV format to the MPEG 1 and MPEG 2 formats (and if the materials are of the MPEG 2 format, the server 10 will learn that the materials are to be converted into the MPEG 1 format).

Then, the server 10 converts the material format (i.e., the DV format in this example) of each of the materials into one of the available target formats, e.g., the MPEG 1 format in step 304; and assigns the converted materials, i.e., movie0001.mp1 and movie0002.mp1 respective material IDs, e.g., S2560 and S2737 (401) as shown in FIG. 4 and stores the materials in step 305. In order to permit the server 10 to identify the materials both written in the scenario and stored in the mass storage device by using only the material IDs 401, the server 10 again rewrites material information and MatIDinVSC's with corresponding material IDs in the received scenario 200 in step 306 to obtain an ID-converted scenario whose data structure is the same as that of the scenario 500.

In the next step 307, the server 10 converts data in the ID-converted scenario which data are dependent on the material format referring to a scenario conversion table as shown in FIG. 7. The scenario conversion table of FIG. 7 contains scenario conversion information or data to be converted with the format conversion of materials for each of possible conversion patterns (i.e., combinations of possible input formats and output (or target) formats). If, for example, a material of the DV format is converted into the MPEG 1 format, the scenario conversion information field in this case reads "Time=Time*100" in FIG. 7. This means that converting each of the values of the "Time" items 232 into a hundredth of the value ensures that a material the format of which has been converted from the DV format to the MPEG 1 format is played in the same way as the material had not been converted.

Thus if the material format is converted, then scenario data has to be converted accordingly for the following reason. A multimedia application used in the embodiment of the invention is in the form of a combination of main materials of moving pictures and other materials. The main moving picture materials determine the time axis in a play of the application, that is, each frame of the main moving picture materials serves as a unit of time in an application play. For this, the unit of time information in a scenario depends on the format of the main moving picture materials.

FIG. 8 is a scenario 800 obtained by converting data in the ID-converted scenario which data are dependent on the material format referring to the scenario conversion table of FIG. 7. In the scenario 800, MatIDinVSC's 221, i.e., V0001, V0002 and V0003 have been replaced with corresponding material IDs 401, i.e., S2560, S2737 and S5116, respectively as described in step 306 and the values of the Time items 832 have been scaled down to a hundredth as described in step 307. It is noted that the material information (MatData's) 223 have been eliminated in the scenario 800. This is because the material IDs 401 are so determined that the server 10 can identify the materials only by means of the material IDs.

In step 308, the server 10 stores the obtained scenario 800 in association with the above mentioned title ID and the current target material format. Then the server 10 makes a test in decision step 309 to see if the possible target formats obtained in step 303 have been exhausted. If so, then the server 10 ends the registration operation. Otherwise, the server 10 returns to step 304.

In this way, scenarios and materials used for the scenarios are prepared and stored for each of the available moving picture material formats. All of the stored scenarios are managed by using a table of FIG. 9. FIG. 9 is a diagram showing a part of a scenario information table used for identifying the scenarios in the server 10. The table of FIG. 9 comprises the fields of the title ID 901 for identifying multimedia applications, the material format 222 which contains available material formats for the application, and scenario information 902 which is a file name of a file containing the scenario having the title ID and the material format. As seen from FIG. 9, the application identified by the title ID "T0001" is available in any of the three material formats, i.e., the DV, MPEG 1 and MPEG 2 formats through the files of scenario information title001dv.vsc, title001m1.vsc and title001m2.vsc, respectively.

FIG. 10 is a flow chart showing an exemplary service operation executed by the multimedia server 10 under the control of a service program to which scheme 1 of the invention is applied. On receiving, from one of the consuming devices or clients 3, a service request for a title ID with a material format of moving picture materials the requesting client can play, the server 10 starts the service operation of FIG. 10. It is assumed that the server 10 has received T0001 and the MPEG 1 format as the title ID and the moving picture material format, respectively. Then in FIG. 10, the server 10 first reads the scenario data identified by the received title ID T0001 and the material format MPEG 1 from the storage device 11 in step 101.

In step 102, the server 10 rewrites the material IDs with MatIDinVSC's and adds material information (MatData) to each line of the MATERIAL section in the read scenario so that the consumer device 3 can identify the data stored in the server 10. FIG. 11 is a diagram showing a scenario data obtained by the operation of step 102. Finally in step 103 the server 10 sends the scenario of FIG. 11 and the material data listed in the MATERIAL section of the scenario to the requesting client 3.

Instead of the server 10 sending both of the scenario and the materials in step 103, the server 10 may send the scenario only in step 103, and thereafter the client 3 may obtain the materials referring to the received scenario.

Scheme 2

In scheme 2, the materials of each application are converted in the registration operation for the application and the scenario of a requested application is converted in the service operation. The server 10 affords a quicker service at the cost of moderate capacity of the mass storage device 11.

Figure 12:
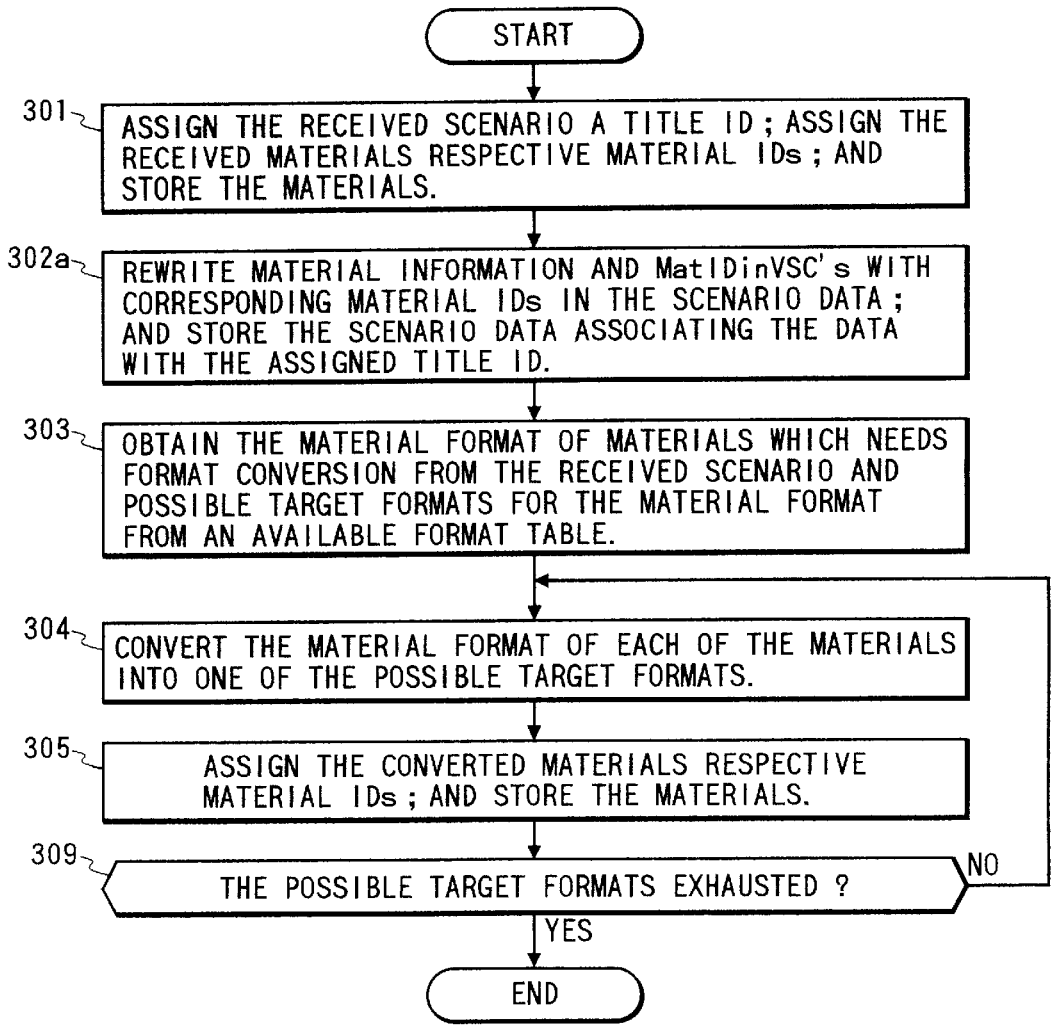
FIG. 12 is a flow chart showing an exemplary registration operation executed by the multimedia server 10 under the control of a program to which scheme 2 of the invention is applied.

FIG. 12 is a flow chart showing an exemplary registration operation executed by the multimedia server 10 under the control of a program to which scheme 2 of the invention is applied. In the following description, it is assumed that the server 10 receives the same application from the multimedia source device 2 as in the above description of scheme 1. The registration operation of FIG. 12 is identical to that of FIG. 3 except that the steps 306 through 308 (the registration of scenarios for material formats other than the input format, i.e., the DV format in this example) have been eliminated and the step 302 has been replaced with step 302*a*. For this, only the step 302*a* will be described.

In scheme 1, the scenarios in the server 10 has to be identified by using both of the title ID and the moving picture material format in scheme 1 because a plurality of scenarios of different formats are stored for each application, while the scenarios in the server 10 of scheme 2 can be identified only by the title ID. Because only the scenario of the input format is stored for each application (and accordingly the title ID serves as a scenario ID) in scheme 2. For this reason, in step 302*a*, the server 10 rewrites material information and MatIDinVSC's with corresponding material IDs in the scenario data; and stores the scenario data associating the data with the title ID assigned in step 301.

FIG. 13 is a diagram showing a part of a scenario information table used for identifying the scenarios in the server 10 according to scheme 2 of the invention. This table corresponds to the table of FIG. 9. However, from just described reason, the table of FIG. 13 contains no information on material format, that is, the table lacks the MATERIAL FORMAT field and the values of the SCENARIO INFORMATION fields do not include any element indicative of the material format as expressed like "title001.vsc".

FIG. 14 is a flow chart showing an exemplary service operation executed by the multimedia server 10 under the control of a service program to which scheme 2 of the invention is applied. The service operation of FIG. 14 is identical to that of FIG. 10 of scheme 1 except that the step 101 has been replaced with step 101*a* and step 307 of FIG. 3 has been inserted between the steps 102 and 103.

On receiving, from one of the consuming devices or clients 3, a service request for a title ID with a material format of moving picture materials the requesting client can play, the server 10 starts the service operation of FIG. 14. The server 10 first reads the scenario data from the storage device 11 by using the received title ID in step 101*a*. In this step, the material format of moving picture materials is not used for the same reason as described in conjunction with the step 302*a*. Then, the server 10 executes the step 102 and proceeds to step 307. In step 307, the server 10 converts scenario data dependent on the material format according to the scenario conversion table of FIG. 7. Finally, the server 10 sends the scenario and the materials used in the scenario to the requesting client 3 in step 103 to end the registration operation.

According to this scheme, since the applications stored in the server 10 have had moving picture materials thereof format-converted, the server 10 affords a quick response to a service request.

Scheme 3

In scheme 3, both of the scenario and the materials for a requested application are converted in the service operation. The server 10 of this scheme only needs the smallest capacity for the mass storage device 11 but is slowest in response among the four schemes.

FIG. 15 is a flow chart showing an exemplary registration operation executed by the multimedia server 10 under the control of a program to which scheme 3 of the invention is applied. The registration operation of FIG. 15 is identical to that of FIG. 12 of scheme 2 except that the operation of FIG. 15 comprises only two steps 301 and 302*a*. Specifically, the scenario and the materials received from the multimedia source device 2 are so stored that the server 10 can manage the scenario and the materials.

Figure 16:
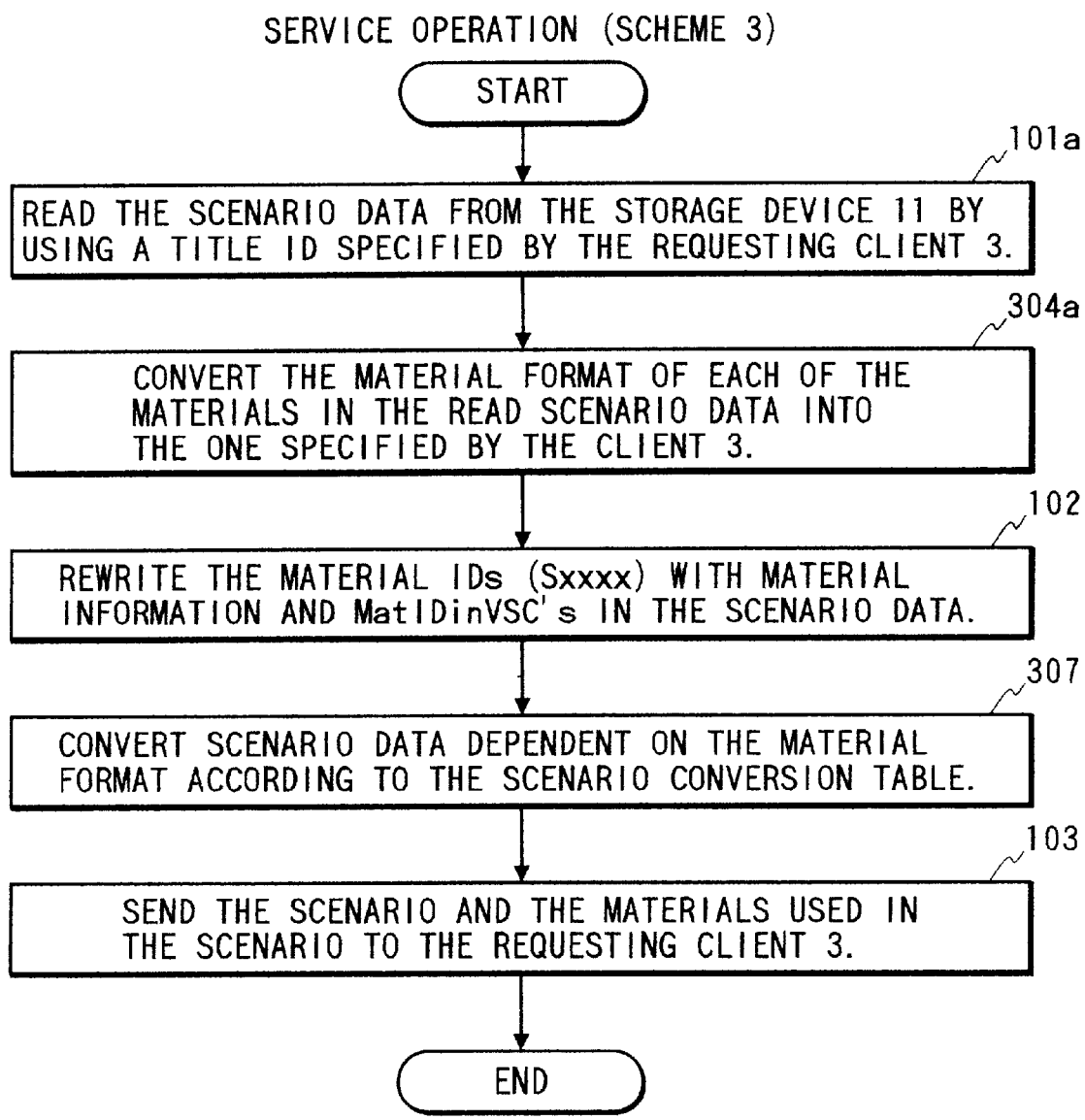
FIG. 16 is a flow chart showing an exemplary service operation according to scheme 3 of the invention.

FIG. 16 is a flow chart showing an exemplary service operation executed by the multimedia server 10 under the control of a service program to which scheme 3 of the invention is applied. The service operation of FIG. 16 is identical to that of FIG. 14 of scheme 2 except that step 304*a* (or a material format conversion step) has been inserted between the steps 101*a* and 102.

After reading the scenario with a title ID specified by the requesting client 3 in step 101*a*, the server 10 converts the material format of each of the materials in the read scenario into the format specified by the client 3 in step 304*a*. Thereafter, the server 10 executes the steps 102, 307 and 103 as in case of FIG. 14 and ends the service operation.

Scheme 4

In scheme 4, materials which take more time for format conversion are converted in the registration operation, and the scenario of requested application and, if the materials for the requested application have not been converted, such materials are converted in the service operation.

FIG. 17 is an exemplary available material format table 170 which defines and classifies possible format conversions by operation in which the conversion is to be done. In the table 170 of FIG. 17, each record of which comprises an INPUT FORMAT field and a TARGET FORMAT field which contains possible target formats into which the input format can be converted and which is divided into a CONVERTED AT REGISTRATION TIME field and a CONVERTED AT SERVICE TIME field. According to the exemplary table 170, if the input format is DV, then the DV format (i.e., moving picture materials in the DV format) is to be converted into the MPEG 1 format and the MPEG 2 format in service operation and registration operation, respectively. If the input format is MPEG 2, then the MPEG 2 format is to be converted into the MPEG 1 format in service operation.

FIG. 18 is a flow chart showing an exemplary registration operation executed by the multimedia server 10 under the control of a program to which scheme 4 of the invention is applied. It is assumed in the following description that the server 10 has received the same multimedia application as in case of the above described schemes, that is, the application with a title "Title0001" and of the DV format.

On entering the registration operation of FIG. 18, the server 10 assigns the received scenario a title ID; assigns the received materials respective material group IDs, which each is to be shared by all the materials obtained by converting the format of a material received from the multimedia source device 2; and stores the materials associating the materials with respective material group IDs and material formats in step 181. It should be noted that each of the material group IDs assigned to the received materials is also assigned to a group of materials into which a received material is converted in format. For this reason, the server 10 has to use a material group ID and a material format in order to identify a material stored in the mass storage device 11.

FIG. 19 is a table kept by the server 10 to manage the materials in the server 10. In FIG. 19, each record comprises a material group ID (M.G. ID) field containing a material group ID, a MATERIAL FORMAT field containing a material format, and a MATERIAL INFORMATION field containing material information or a file name of the material identified by the material ID and the material format. It is seen from FIGS. 2 and 19 that the server 10 assigns a material group ID "S0245" to a received material "movie0001.dv" of the DV format, "S0140" to "movie0002.dv" of the DV format, and "S0221" to "image0001.bmp" of the BMP format in step 181.

In step 182, the server 10 rewrites material information and MatIDinVSC's with in the scenario data, i.e., replaces MatIDinVSC's with corresponding material group IDs and deletes material information; and stores the scenario data associating the data with the assigned title ID. Executing the steps 181 and 182 causes the scenario 200 of FIG. 2 to be converted as shown in FIG. 20. In FIG. 20, MatIDinVSC's V0001, V0002 and V0003 have been replaced with material group IDs S0245, S0140 and S0221, respectively, and material information has been eliminated.

In step 183, the server refers to the table 170 of FIG. 17 and makes a test to see if the input format (or the moving picture material format) of the received application is to be converted at the service operation or makes a reverse test to see if the materials may have to be converted now, that is, if any of the records whose INPUT FORMAT fields contain the format of the received application has the value of "registration" in the TO-BE-CONVERTED-AT field. If the test result is YES or the reverse test result is NO in the decision step 183, then the server 10 ends the registration operation. (If the input format is DV for example, then the test result is NO and the reverse test result is YES; if the input format is MPEG 2 for example, then the test result is YES and the reverse test result is NO.) Otherwise (i.e., the input format was DV), the server 10 proceeds to step 184 and obtains a target format into which the materials are to be converted at the registration time from the table of FIG. 17. As seen from the table 170, the server 10 obtains the MPEG 2 format as a target format.

In step 185, the server 10 converts the material format of each of the materials of the received application into the target format or MPEG 2. In step 186, the server 10 assigns the converted materials respective material ID and stores the materials. Then in decision step 187, the server 10 makes a test to see if the target formats into which the materials are to be converted now have been exhausted. If so, the server 10 ends the registration operation. Otherwise, the server 10 returns to the step 184.

FIG. 21 is a flow chart showing an exemplary service operation executed by the multimedia server 10 under the control of a service program to which scheme 4 of the invention is applied. The service operation of FIG. 21 is identical to that of FIG. 16 or scheme 3 except that decision step 210 has been inserted between the steps 101a and 304a. Specifically, after reading out the scenario associated with a specified title ID in step 101a, the server 10 proceeds to step 210, where it refers to the table of FIG. 17 and makes a test to see if the material format specified by the client 3 has been prepared in the registration operation. If so, the server 10 proceeds to the step 102a skipping the step 304a. Otherwise, the server 10 proceeds to the step 304a. Operation after the step 304a is identical to that of FIG. 16 or scheme 3 except that step 102a rewrites the material group IDs instead of the material IDs.

According to scheme 4 of the invention, controlling the timing of format conversion by using the table of FIG. 17 enables the server 10 to afford quicker service of multimedia applications while preventing the pressure on the mass storage device 11.

Scheme 5

Though in the above described illustrative embodiments, target formats of the moving picture materials have been obtained from various material formats which contain more information as compared with the target formats, it is preferable to obtain every target format from one of master data formats, i.e., data formats that each contain the maximum quantity of information in all the data formats for one category of materials. This enables the server 10 to provide multimedia information of much higher quality. As a master data format for moving picture materials, the DV format is preferable at present.

This feature of the invention can be easily realized by any of the embodiments of the above described schemes 1 through 4 further comprising a master data table as shown in FIG. 22, removing other records than that of a master data format from the available material format table of FIG. 6 or FIG. 17, and, if a received material from the multimedia information source is not of the master data format, using a corresponding material of the master data format instead of the received material referring to the master data table of FIG. 22 in a format conversion, which is performed in step 304 of FIG. 3 or 12, in step 304a of FIG. 16, or in steps 185 of FIG. 18 and 304a of FIG. 21. The master data table of FIG. 22 contains records for materials stored in the server. Each of the record of the master data table comprises the fields of material information, master data information from which the material has been obtained, and a master data format.

According to the fifth scheme of the invention, if the server 10 receives from a multimedia information source an application including a moving picture material whose format is other than a master data format without a capability of playing a material of the master data format, and if the server 10 has obtained a corresponding material of the master data format, then the server 10 can convert in format the application by using the material of the master data format.

Modifications

Though format conversions are applied only to the moving picture materials in the above embodiments, format conversions may be applied to materials of any other kinds than moving pictures, for example, still picture materials, text materials, etc. in the same way. Also, as format conversions, a material format may be converted into one of a different resolution or of a different number of colors in the same way.

The moving picture material format the requesting client 3 can play is sent to the server 10 with a title ID in the above described embodiments. However, the client 3 may send the client ID instead of the material format and the server 10 may keep a table which associates each of the client IDs with a material format the client of the client ID can play.

Many widely different embodiments of the present invention may be constructed without departing from the spirit and scope of the present invention. It should be understood that the present invention is not limited to the specific embodiments described in the specification, except as defined in the appended claims.

What is claimed is:

1. In a multimedia information service system wherein multimedia applications each comprising plural kinds of materials and a scenario which describes how each material plays its role in each multimedia application are supplied by a source device in an input format associated with the source device and used by a plurality of consuming devices associated with different formats, a server for serving one of said (multimedia) applications in a format with which a requesting one of the consuming devices can deal with respect to materials of a certain kind among the plural kinds, the server comprising:

means, responsive to a reception of a new application from said source device, for converting an input format of said certain kind of materials of said new application into all of said target formats associated with said input format;

means, responsive to said reception and operative on a scenario of said new application, for preparing scenarios, adapted to all of said target formats, of said new application, said adaptation including time scale adjustment; and means responsive to a request for said one of said applications for serving said requesting one of said consuming devices with at least a scenario of said one of said applications which scenario has been adapted to said format with which said requesting one of said consuming devices can deal.

2. A server as defined in claim 1, wherein instead of converting said input format of said certain kind of materials, said input format converting means converts materials of a master data format from which said certain kind of materials of said input format have been obtained.

3. A server as defined in claim 2, wherein said master data format is a DV format.

4. A server as defined in claim 1, wherein said certain kind of materials is one of a moving picture, a still picture, and a text material.

5. A server as defined in claim 1, wherein said input format includes a certain resolution, and said target formats include resolutions different from one another and said certain resolution.

6. A server as defined in claim 1, wherein said input format includes a certain number of displayed colors, and said target formats include numbers of displayed colors which numbers are different from one another and from said certain number.

7. In a multimedia information service system wherein multimedia applications each comprising plural kinds of materials and a scenario which describes how each material plays its role in each multimedia application are supplied by a source device in an input format associated with the source device and used by a plurality of consuming devices associated with different formats, a server for serving one of said (multimedia) applications in a format with which a requesting one of the consuming devices can deal with respect to materials of a certain kind among the plural kinds, the server comprising:

means, responsive to a reception of a new application from said source device, for converting an input format of said certain kind of materials of said new application into all of said target formats associated with said input format;

means, responsive to a request for said one of said applications and operative on a scenario of said one of said applications which scenario is for said input format, for preparing a scenario of said one of said applications which scenario is adapted to said format with which said requesting one of said consuming devices can deal, said adaptation including time scale adjustment; and means responsive to a request for said one of said applications for serving said requesting one of said consuming devices with at least a scenario of said one of said applications which scenario has been adapted to said format with which said requesting one of said consuming devices can deal.

8. A server as defined in claim 7, wherein instead of converting said input format of said certain kind of materials, said input format converting means converts materials of a master data format from which said certain kind of materials of said input format have been obtained.

9. A server as defined in claim 8, wherein said master data format is a DV format.

10. In a multimedia information service system wherein multimedia applications each comprising plural kinds of materials and a scenario which describes how each material plays its role in each multimedia application are supplied by a source device in an input format associated with the source device and used by a plurality of consuming devices associated with different formats, a server for serving one of said (multimedia) applications in a format with which a requesting one of the consuming devices can deal with respect to materials of a certain kind among the plural kinds, the server comprising:

means, responsive to a request for said one of said applications, for converting an input format of said certain kind of materials of said one of said applications into said format with which said requesting one of said consuming devices can deal;

means, responsive to said request and operative on a scenario of said one of said applications which scenario is for said input format, for preparing a scenario of said one of said applications which scenario is adapted to said format with which said requesting one of said consuming devices can deal, said adaptation including time scale adjustment; and means responsive to a request for said one of said applications for serving said requesting one of said consuming devices with at least a scenario of said one of said applications which scenario has been adapted to said format with which said requesting one of said consuming devices can deal.

11. A server as defined in claim 10, wherein instead of converting said input format of said certain kind of materials, said input format converting means converts materials of a master data format from which said certain kind of materials of said input format have been obtained.

12. A server as defined in claim 11, wherein said master data format is a DV format.

13. In a multimedia information service system wherein multimedia applications each comprising plural kinds of materials and a scenario which describes how each material plays its role in each multimedia application are supplied by a source device in an input format associated with the source device and used by a plurality of consuming devices associated with different formats, a server for serving one of said (multimedia) applications in a format with which a requesting consuming device can deal with respect to materials of a certain kind among the plural kinds, the server comprising:

means, responsive to a reception of a new application from said source device, for making a first decision on whether to postpone conversions of an input format of said certain kind of materials of said new application until a request for said new application;

means responsive to a negative result of said first decision for converting said input format of said certain kind of materials of said new application into only predetermined ones of said target formats associated with said input format;

means responsive to a request for said one of said applications for making a second decision on whether said format with which said requesting consuming device can deal has been prepared for materials of said one of said applications; and means responsive to a negative result of said second decision for converting said input format of said certain kind of materials of said one of said applications into said format with which said requesting consuming device can deal;

means, responsive to said request for said one of said applications and operative on a scenario of said one of said applications which scenario is for said input format, for preparing a scenario of said one of said applications which scenario is adapted to said format with which said requesting consuming device can deal, said adaptation including time scale adjustment; and means responsive to a request for said one of said applications for serving said requesting consuming device with at least a scenario of said one of said applications which scenario has been adapted to said format with which said requesting consuming device can deal.

14. A server as defined in claim 13, wherein instead of converting said input format of said certain kind of materials, said input format converting means converts materials of a master data format from which said certain kind of materials of said input format have been obtained.

15. A server as defined in claim 14, wherein said master data format is a DV format.

16. In a multimedia information service system wherein multimedia applications each comprising plural kinds of materials and a scenario which describes how each material plays its role in each multimedia application are supplied by a source device in an input format associated with the source device and used by a plurality of consuming devices associated with different formats, and wherein said scenario of each of said multimedia applications comprises a material description of each of materials constituting said multimedia application, each material description including format data indicative of a format of a material for which said each material description is intended and an event description of each of events controlling said application, a server for serving one of said (multimedia) applications in a format with which a requesting one of the consuming devices can deal with respect to materials of a certain kind among the plural kinds, the server comprising:

means, responsive to a reception of a new application from said source device, for converting an input format of said certain kind of materials of said new application into all of said target formats associated with said input format;

means, responsive to said reception and operative on a scenario of said new application, for preparing scenarios, adapted to all of said target formats, of said new application, said adaptation including time scale adjustment; and means responsive to a request for said one of said applications for serving said requesting one of said consuming devices with at least a scenario of said one of said applications which scenario has been adapted to said format with which said requesting one of said consuming devices can deal, wherein said means for preparing least one scenario] scenarious comprises:

means operative on said each material description for converting said format data from said input format to said at least one of target formats to yield said at least one scenario for said at least one of target formats; and means operative on each event description for rewriting said data dependent on said format by using information associated with said input format and said at least one of target formats to yield said at least one scenario for said at least one of target formats.

17. In a multimedia server supplied by a source device with multimedia applications, each comprising plural kinds of materials and a scenario which describes how each material plays its role in each multimedia application, and which serves a plurality of consuming devices, a method for serving one of said (multimedia) applications in a format with which a requesting one of the consuming devices can deal with respect to materials of a certain kind among the plural kinds, the method comprising the steps of:

in response to a reception of a new application from said source device, converting an input format of said certain kind of materials of said new application into all of said target formats associated with said input format;

in response to said reception and on the basis of a scenario of said new application, preparing scenarios of said new application which scenarios are adapted to all of said target formats, said adaptation including adjusting a time scale; and in response to a request for said one of said applications, serving said requesting one of said consuming devices with at least a scenario of said one of said applications which scenario has been adapted to said format with which said requesting one of said consuming devices can deal.

18. In a multimedia server supplied by a source device with multimedia applications, each comprising plural kinds of materials and a scenario which describes how each material plays its role in each multimedia application, and which serves a plurality of consuming devices, a method for serving one of said (multimedia) applications in a format with which a requesting one of the consuming devices can deal with respect to materials of a certain kind among the plural kinds, the method comprising the steps of:

in response to a reception of a new application from said source device, converting an input format of said certain kind of materials of said new application into all of said target formats associated with said input format;

in response to a request for said one of said applications and on the basis of a scenario of said one of said applications which scenario is for said input format, preparing a scenario of said one of said applications which scenario is adapted to said format with which said requesting one of said consuming devices can deal, said adaptation including adjusting a time scale; and in response to a request for said one of said applications, serving said requesting one of said consuming devices with at least a scenario of said one of said applications which scenario has been adapted to said format with which said requesting one of said consuming devices can deal.

19. In a multimedia server supplied by a source device with multimedia applications, each comprising plural kinds of materials and a scenario which describes how each material plays its role in each multimedia application, and which serves a plurality of consuming devices, a method for serving one of said (multimedia) applications in a format with which a requesting one of the consuming devices can deal with respect to materials of a certain kind among the plural kinds, the method comprising the steps of:

in response to a request for said one of said applications, converting an input format of said certain kind of materials of said one of said applications into said format with which said requesting one of said consuming devices can deal;

in response to said request and on the basis of a scenario of said one of said applications which scenario is for said input format, preparing a scenario of said one of said applications which scenario is adapted to said format with which said requesting one of said consuming devices can deal, said adaptation including adjusting a time scale; and in response to a request for said one of said applications, serving said requesting one of said consuming devices with at least a scenario of said one of said applications which scenario has been adapted to said format with which said requesting one of said consuming devices can deal.

20. In a multimedia server supplied by a source device with multimedia applications, each comprising plural kinds of materials and a scenario which describes how each material plays its role in each multimedia application, and which serves a plurality of consuming devices, a method for serving one of said (multimedia) applications in a format with which a requesting consuming device can deal with respect to materials of a certain kind among the plural kinds, the method comprising the steps of:

in response to a reception of a new application from said source device, making a first decision on whether to postpone conversions of an input format of said certain kind of materials of said new application until a request for said new application;

in response to a negative result of said first decision, converting said input format of said certain kind of materials of said new application into only predetermined ones of said target formats associated with said input format;

in response to a request for said one of said applications, making a second decision on whether said format with which said requesting consuming device can deal has been prepared for materials of said one of said applications; and in response to a negative result of said second decision, converting said input format of said certain kind of materials of said one of said applications into said format with which said requesting consuming device can deal;

in response to said request for said one of said applications and on the basis of a scenario of said one of said applications which scenario is for said input format, preparing a scenario of said one of said applications which scenario is adapted to said format with which said requesting consuming device can deal, said adaptation including adjusting a time scale; and in response to a request for said one of said applications, serving said requesting consuming device with at least a scenario of said one of said applications which scenario has been adapted to said format with which said requesting consuming device can deal.

21. In a multimedia information service system wherein multimedia applications each comprising plural kinds of materials and a scenario which describes how each material plays its role in each multimedia application are supplied by a source device in an input format associated with the source device and used by a plurality of consuming devices associated with different formats, and wherein said scenario of each of said multimedia applications comprises a material description of each of materials constituting the multimedia application and an event description of each of events controlling the application, each material description including format data indicative of a format of a material for which each material description is intended, a server for serving one of the (multimedia) applications in a format with which a requesting one of the consuming devices can deal with respect to materials of a certain kind among the plural kinds, the server comprising:

means, responsive to a reception of a new application from said source device, for converting an input format of said certain kind of materials of said new application into all of said target formats associated with said input format;

means, responsive to a request for said one of said applications and operative on a scenario of said one of said applications which scenario is for said input format, for preparing a scenario of said one of said applications which scenario is adapted to said format with which said requesting one of said consuming devices can deal, said adaptation including time scale adjustment; and means responsive to a request for said one of said applications for serving said requesting one of said consuming devices with at least a scenario of said one of said applications which scenario has been adapted to said format with which said requesting one of said consuming devices can deal, wherein said means for preparing a scenario of said one of said applications comprises:

means operative on said each material description for converting said format data from said input format to said at least one of target formats to yield said at least one scenario for said at least one of target formats; and means operative on each event description for rewriting said data dependent on said format by using information associated with said input format and said at least one of target formats to yield said at least one scenario for said at least one of target formats.

22. In a multimedia information service system wherein multimedia applications each comprising plural kinds of materials and a scenario which describes how each material plays its role in each multimedia application are supplied by a source device in an input format associated with the source device and used by a plurality of consuming devices associated with different formats, and wherein the scenario of each of said multimedia applications comprises a material description of each of materials constituting the multimedia application and an event description of each of events controlling the application, each material description including format data indicative of a format of a material for which each material description is intended, a server for serving one of said (multimedia) applications in a format with which a requesting one of the consuming devices can deal with respect to materials of a certain kind among the plural kinds, the server comprising:

means, responsive to a request for said one of said applications, for converting an input format of said certain kind of materials of said one of said applications into said format with which said requesting one of said consuming devices can deal;

means, responsive to said request and operative on a scenario of said one of said applications which scenario is for said input format, for preparing a scenario of said one of said applications which scenario is adapted to said format with which said requesting one of said consuming devices can deal, said adaptation including time scale adjustment; and means responsive to a request for said one of said applications for serving said requesting one of said consuming devices with at least a scenario of said one of said applications which scenario has been adapted to said format with which said requesting one of said consuming devices can deal;

wherein said means for preparing a scenario of said one of said applications comprises:

means operative on said each material description for converting said format data from said input format to said at least one of target formats to yield said at least one scenario for said at least one of target formats; and means operative on each event description for rewriting said data dependent on said format by using information associated with said input format and said at least one of target formats to yield said at least one scenario for said at least one of target formats.

23. In a multimedia information service system wherein multimedia applications each comprising plural kinds of materials and a scenario which describes how each material plays its role in each multimedia application are supplied by a source device in an input format associated with the source device and used by a plurality of consuming devices associated with different formats, and wherein the scenario of each of said multimedia applications comprises a material description of each of materials constituting the multimedia application and an event description of each of events controlling the application, each material description including format data indicative of a format of a material for which each material description is intended, a server for serving one of said (multimedia) applications in a format with which a requesting consuming device can deal with respect to materials of a certain kind among the plural kinds, the server comprising:

means, responsive to a reception of a new application from said source device, for making a first decision on whether to postpone conversions of an input format of said certain kind of materials of said new application until a request for said new application;

means responsive to a negative result of said first decision for converting said input format of said certain kind of materials of said new application into only predetermined ones of said target formats associated with said input format;

means responsive to a request for said one of said applications for making a second decision on whether said format with which said requesting consuming device can deal has been prepared for materials of said one of said applications; and means responsive to a negative result of said second decision for converting said input format of said certain kind of materials of said one of said applications into said format with which said requesting consuming device can deal;

means, responsive to said request for said one of said applications and operative on a scenario of said one of said applications which scenario is for said input format, for preparing a scenario of said one of said applications which scenario is adapted to said format with which said requesting consuming device can deal, said adaptation including time scale adjustment; and means responsive to a request for said one of said applications for serving said requesting consuming device with at least a scenario of said one of said applications which scenario has been adapted to said format with which said requesting consuming device can deal, wherein said means for preparing a scenario of said one of said applications comprises:

means operative on said each material description for converting said format data from said input format to said at least one of target formats to yield said at least one scenario for said at least one of target formats; and means operative on each event description for rewriting said data dependent on said format by using information associated with said input format and said at least one of target formats to yield said at least one scenario for said at least one of target formats.

* * * * *

UNITED STATES PATENT AND TRADEMARK OFFICE
CERTIFICATE OF CORRECTION

PATENT NO.    : 6,615,252 B1
DATED         : September 2, 2003
INVENTOR(S)   : Toshio Oka et al.

It is certified that error appears in the above-identified patent and that said Letters Patent is hereby corrected as shown below:

Title page,
Insert Item -- [30] Foreign Application Priority Data
Mar. 10, 1997   (JP)......................... 9-70923 --

Signed and Sealed this

Ninth Day of August, 2005

JON W. DUDAS
*Director of the United States Patent and Trademark Office*